United States Patent [19]

Jaenecke

[11] Patent Number: 5,384,897
[45] Date of Patent: Jan. 24, 1995

[54] ABSTRACTOR

[75] Inventor: Peter Jaenecke, Straubenhardt, Germany

[73] Assignee: Alcatel N.V., Amsterdam, Netherlands

[21] Appl. No.: 958,901

[22] Filed: Oct. 9, 1992

[30] Foreign Application Priority Data

Oct. 14, 1991 [DE] Germany ............................ 4133965

[51] Int. Cl.⁶ ............................................ G06F 15/18
[52] U.S. Cl. .......................................... 395/27; 395/24
[58] Field of Search ................ 395/27, 24; 371/6, 41, 371/69.1; 364/737, 740, 741

[56] References Cited

U.S. PATENT DOCUMENTS

| | | | |
|---|---|---|---|
| 3,638,182 | 1/1972 | Progler et al. ........................... | 371/6 |
| 3,700,820 | 10/1972 | Blasbalg et al. ....................... | 370/82 |
| 4,326,259 | 4/1982 | Cooper et al. ........................ | 395/24 |
| 4,852,105 | 7/1989 | Kurz .................................... | 371/69.1 |
| 4,885,757 | 12/1989 | Provence ............................. | 395/24 |
| 5,073,954 | 12/1991 | Van Tyne et al. .................... | 235/462 |

OTHER PUBLICATIONS

Strohbehn et al., "A Bit-Serial VLSI Receptive Field Accumulator", Proceedings of IEEE Custom Integrated Circuits Conference, May 15–18, 1989, pp. 12.5.1–12.5.6.

Carpenter et al., "ART 2: Self-Organization of Stable Category Recognition Codes for Analog Input Patterns," Applied Optics, vol. 26, No. 23, Dec. 1, 1987, pp. 4919–4930.

Lippmann, "An Introduction to Computing with Neural Nets," IEEE ASSP Magazine, Apr. 1987, pp. 4–22.

Primary Examiner—Allen R. MacDonald
Assistant Examiner—Stuart B. Shapiro
Attorney, Agent, or Firm—Spencer, Frank & Schneider

[57] ABSTRACT

A digital 1-bit wide abstractor for generating an exemplary pattern from a digital input information E, the abstractor having an evaluation unit which performs a transfer function p and to whose input the digital input information E is fed. The abstractor further includes a first decision unit having a first input which is connected with an output of the evaluation unit, a second input to which the input information E is fed, and third and fourth inputs to which a first predeterminable set value and a second predeterminable set value, respectively, are fed, with the first decision unit implementing an activation state according to an activation function, the first decision unit providing at an output thereof an output information according to an output function.

10 Claims, 3 Drawing Sheets

ABSTRACTOR

CROSS REFERENCE TO RELATED APPLICATION

This application claims the priority of Application Ser. No. P 41 33 965.7, filed Oct. 14, 1991, in the Federal Republic of Germany, the subject matter of which is incorporated herein by reference.

BACKGROUND OF THE INVENTION

The present invention relates to an abstractor having a width of 1 bit, an abstractor having a width of N bits, the use of an abstractor having a width of N bits and to a neural network employing an abstractor having a width of N bits.

In technical as well as biological systems, the transmission of data is subject to interferences. One possibility of ensuring the correct transmission of the data in spite of interferences is to repeat the data to be transmitted (hereinafter called the structural unit) several times at the transmitting end, for example the message 1111 1111 1111 ..., and at the receiving end to reconstruct this message from the repetitions (hereinafter called singulars) arriving there which are interfered with to a greater or lesser extent, for example, 0111 1101 1001 ..., by utilizing their redundancy. This reconstruction is performed by an abstractor which is the object of the invention.

A paradigm for the use of an abstractor is the simulation of visual perception. The eyes are either fixed or moving; as long as they are fixed, they record a sequence of similar images; during movement, a "dark phase" exists in which nothing is perceived. The eye thus furnishes sequences of images of similar contents; a sequence of empty noise images picked up during eye movement lies between every two such sequences. It is not known when the change to a new image sequence takes place; to determine when it happens, is part of the reconstruction task.

The singulars are similar to one another; however, they are also similar to the structural unit from which they evolved due to the superposition of interferences. Similarity means: there are "features" which distinguish the individual singulars from one another and from their structural parent and those which they all have in common. The abstraction process resides in abstracting those "features" in which the singulars differ; these are the locations in particular which were falsified by the interference on the transmission path. If one therefore considers the structural unit as an exemplary pattern of a class of patterns and the associated singular as realizations of this class of patterns, the abstraction process can be understood as the generation of this exemplary pattern from a certain number of examples.

The generation of exemplary patterns from examples has been attempted, among others, with neural networks, for example with a Carpenter-Grossberg classifier. The neural networks known in the art are based on the principle of a weighted spread of activity. They differ from one another in their network topology, their training rules and the characteristics of their nodes (artificial neurons).

Neural networks used as classifiers associate iteratively an unknown pattern to one of the exemplary patterns they have been trained to. Prerequisite for this, however, is the convergence of the iteration process. The networks can be distinguished as those in which the exemplary patterns must be known in advance (such as, for example, in the Hopfield or Hamming networks)—training here corresponds to supervised learning—and those in which the exemplary patterns are formed simultaneously with the training (such as, for example, in a Carpenter-Grossberg network); in this case, unsupervised learning takes place ("An Introduction to Computing with Neural Nets" by R. P. Lippmann, IEEE ASSP Magazine, April, 1987, pages 4-22, "Self-Organization Of Stable Category Recognition Codes For Analog Input Patterns" by G. Carpenter, S. Grossberg, Applied Optics, Dec. 1, 1987, Vol. 26, No. 23, pages 4919-4930).

Only the neural networks of the latter type can be compared with an abstractor. However, they have considerable drawbacks which make them appear unsuitable for use: they are susceptible to interferences; with a given error rate, the convergence of the prior art methods cannot be insured; they are very computation intensive; their use is limited to a defined number of exemplary patterns.

SUMMARY OF THE INVENTION

It is an object of the present invention to realize a digital 1-bit wide abstractor as well as a digital N-bit wide abstractor which is able to generate exemplary patterns from the input information without knowledge of when a change to a new information took place in the input information and without knowledge about the information to be expected.

Another object of the invention is to provide a neural network that includes such an abstractor.

According to the invention, the abstractor always marks that input information as an exemplary pattern that has occurred most frequently within a defined period of time that can be predetermined by a minimum set value $F_{min}$ and a maximum set value $F_{max}$ and extends into the past. By predetermining the set values, an old exemplary pattern can be quickly forgotten and the new pattern generated since the linear succession of numbers can be run through in both directions (to the lower limit value $F_{min}$ or to the upper limit value $F_{max}$).

According to another feature of the invention, the convergence rate (removal of the old pattern, construction of the new pattern) of the abstractor can be accelerated by means of a sensitivity value s in that the run through the linear succession of numbers is accelerated with the given set values $s_{min}$ and $s_{max}$ (multiplication by the factor s).

Particularly advantageous is the generation of a neural network from a plurality of layers, in which an input layer is preceded by an N-bit wide abstractor so as to perform an initial rough recognition.

Further advantageous features of the invention will become apparent from the following detailed description of the preferred embodiments.

BRIEF DESCRIPTION OF THE DRAWINGS

The teaching of the invention will now be described for one embodiment thereof in conjunction with the drawing figures in which.

DETAILED DESCRIPTION OF THE PREFERRED EMBODIMENT

Figure 1:
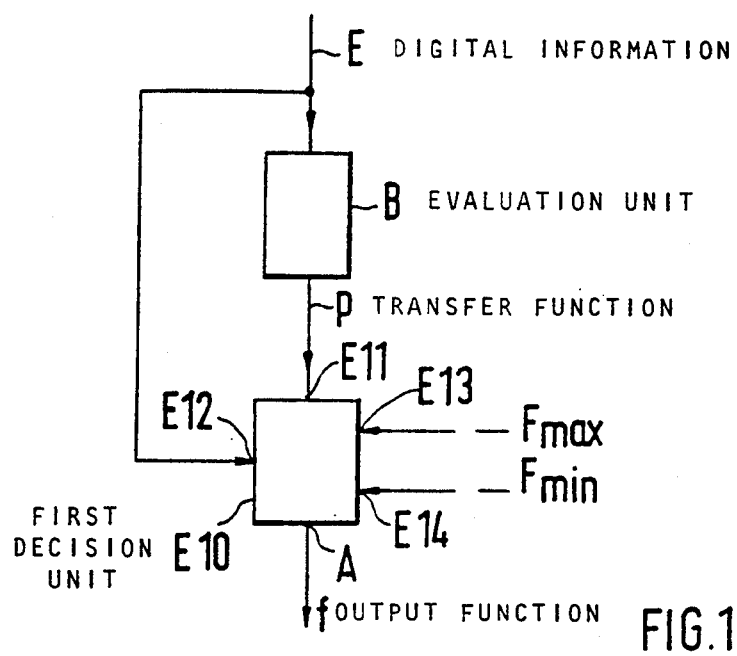
FIG. 1 is a first block circuit diagram of a 1-bit wide abstractor according to the invention.

As shown in FIG. 1, a digital, 1-bit wide abstractor is composed of an evaluation unit B whose input receives a digital input information E. Evaluation unit B implements a transfer function p, where $$p(n) = 2n - 1 \text{ for } n = \begin{cases} 1, & \text{if } E = 1 \\ 0, & \text{if } E = 0 \end{cases}$$

so that a positive value is available at the output of the evaluation unit if the input information E equals 1, and a negative value is available if the input information E equals 0.

The output of evaluation unit B is connected with a first input E11 of a first decision unit E10. The input information E is fed to a second input E12 of the first decision unit E10. A first predeterminable set value $F_{max}$ and a second predeterminable set value $F_{min}$ are available at a third input E13 and a fourth input E14, respectively, of the first decision unit E10, so as to provide an upper limit value and a lower limit value for a run through the linear succession of numbers.

Decision unit E10 implements an activation state z for the abstractor according to an activation function F where $$z = F(z_{old}, p(n)) = \begin{cases} F_{min} & \text{for } z_{old} + p(n) < F_{min} \\ F_{max} & \text{for } z_{old} + p(n) > F_{max} \\ z_{old} + p(n) & \text{for others} \end{cases}$$

In this equation, $z = F(z_{old}, p(n))$ is the new state of the abstractor and $z_{old}$ is its old state. From the respective momentary abstractor state $z_{old}$, decision unit E10 determines an output information according to an output function f, where $$f(z) = \begin{cases} 0 & \text{for } z < 0 \\ E & \text{for } z = 0 \\ 1 & \text{for } z > 0 \end{cases}$$

The output information is thus the information (pattern) which has occurred most frequently in the most recent past. If there is an identical number of occurrences ($z = 0$), the input information is output.

Figure 2:
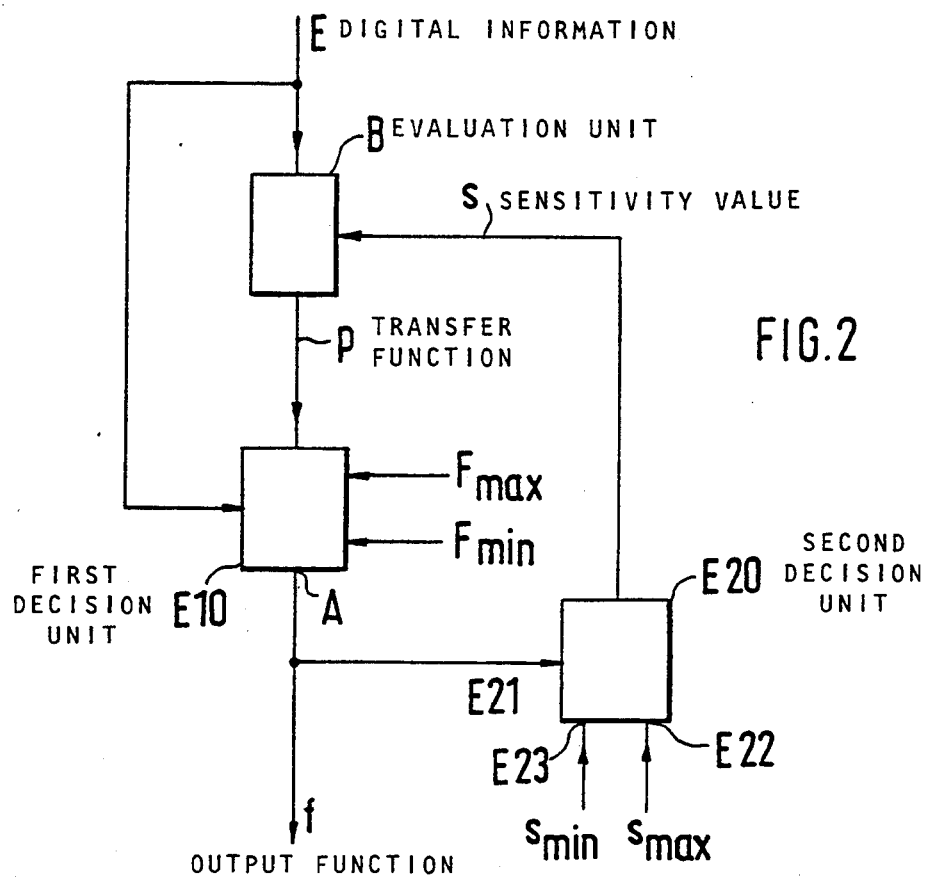
FIG. 2 is a second block circuit diagram of a 1-bit wide abstractor according to the invention.

To obtain a quicker removal of an old pattern and construction of a new pattern due to a change in the input information, a sensitivity value s is introduced (see FIG. 2).

For this purpose the 1-bit wide abstractor according to the invention includes a second decision unit E20 whose first input E21 is connected with the output of the first decision unit E10 (that is, with f(z)). A third predeterminable set value $s_{max}$ and a fourth predeterminable set value $s_{min}$ can be applied to a second input E22 and a third input E23, respectively, of second decision unit E20.

One output of second decision unit E20 is coupled back to a further input of evaluation unit B. Thus the input information E is processed as a function of the output information with a transfer function p(n, s) that has been multiplied by the factor s as follows:

$$p(n,s) = (2n - 1)s, \; n = \begin{cases} 1, & \text{if } E = 1 \\ 0, & \text{if } E = 0 \end{cases}$$

and $$s = \begin{cases} s_{min} & f(z)_{new} = f(z)_{old} \\ & \text{for} \\ s_{max} & \text{others} \end{cases}$$

In the case of a change in the output information, that is $f(z)_{new}$ is not equal to $f(z)_{old}$, the factor s causes the linear succession of numbers to be run through faster in the direction of $F_{min}$ or $F_{max}$ and the construction of the new pattern is faster.

For an example for a faster reduction and the subsequent construction of a pattern by the 1-bit wide abstractor according to the invention, reference is made to Table 1 below. It can be seen that for $s_{min} = 1$ and $s_{max} = 3$, the reconstruction takes place in three clearly distinguishable phases: a first phase (steps 2-9) in which the data "1" is reconstructed; a second, very short phase (steps 10-11) in which the first pattern "1" is reduced and the new pattern is constructed. In this phase, the reconstruction results are uncertain. In a third phase (steps 12-16), data "0" was reconstructed.

TABLE 1

| Step | Received Data | s | $p = (2n_i - 1)s$ | Actual State $z = z_{old} + p$ | Reconstructed Data |
| --- | --- | --- | --- | --- | --- |
| 1 | 1 | 1 | +1 | 1 | |
| 2 | 1 | 1 | +1 | 2 | 1 |
| 3 | 0 | 1 | −1 | 1 | 1 |
| 4 | 1 | 1 | +1 | 2 | 1 |
| 5 | 0 | 1 | −1 | 1 | 1 |
| 6 | 1 | 1 | +1 | 2 | 1 |
| 7 | 0 | 1 | −1 | 1 | 1 |
| 8 | 1 | 1 | +1 | 2 | 1 |
| 9 | 0 | 1 | −1 | 1 | 1 |
| 10 | 0 | 1 | −1 | 0 | 0 |
| 11 | 1 | 3 | +3 | +3 | 1 |
| 12 | 0 | 3 | −3 | 0 | 0 |
| 13 | 0 | 3 | −3 | −3 | 0 |
| 14 | 1 | 1 | +1 | −2 | 0 |
| 15 | 0 | 1 | −1 | −3 | 0 |
| 16 | 1 | 1 | +1 | −2 | 0 |

According to the result of Table 1, it is also evident that a noise period inserted between two useful data sequences has little influence on the abstracting result since noise is distinguished by data that appear, on the average, at an identical frequency.

Figure 3:
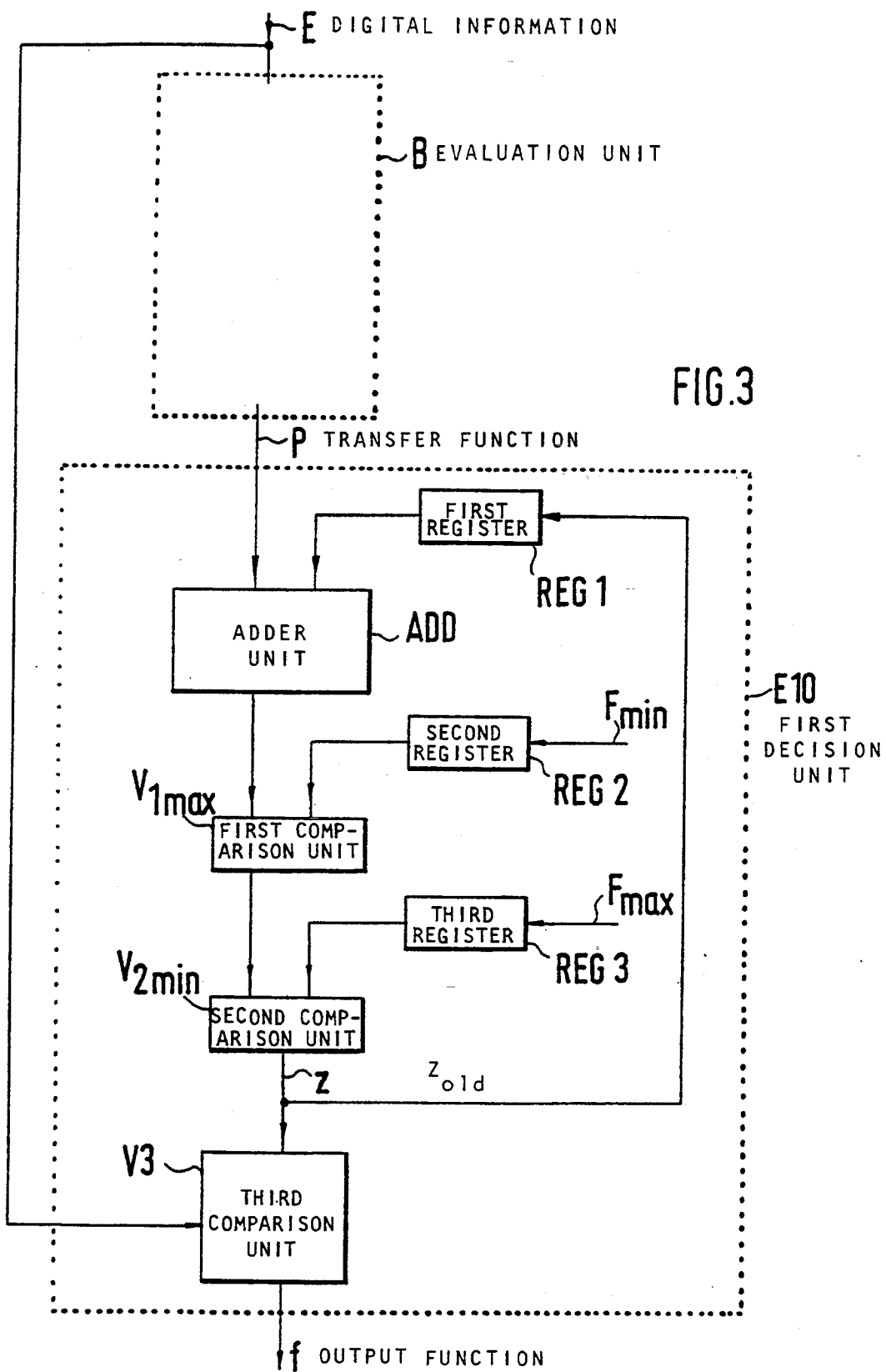
FIG. 3 is a detailed circuit diagram of a 1-bit wide abstractor.

To clarify the mode of operation of the abstractor, a detailed circuit diagram of the 1-bit wide abstractor according to FIG. 3 will now be described.

The first decision unit E10 includes an adder unit ADD, a first register REG1, a second register REG2 and a third register REG3, as well as a first comparison unit V1$_{max}$, a second comparison unit V2$_{min}$ and a third comparison unit V3.

A first input of adder unit ADD is connected with the output of evaluation unit B so that an input information which was processed with the transfer function p(n) is present at the adder unit ADD, where $$p(n) = 2n - 1 \text{ for } n = \begin{cases} 1, & \text{if } E = 1 \\ 0, & \text{if } E = 0 \end{cases}$$

A second input of adder unit ADD is connected with a first register REG1 in which the respectively preceding value $z_{old}$ of the abstractor is stored in each case.

One output of adder unit ADD (that is, $p(n) + Z_{old}$) is connected with a first input of the first comparison unit V1$_{max}$. A second input of first comparison unit V1$_{max}$ is connected with the second register REG2. The second set value $F_{min}$ is storable in the second register.

The first comparison unit V1$_{max}$ always forwards the larger of the two values ($z_{old} + p(n)$; $F_{min}$) present at its inputs to a first input of the second comparison unit V2$_{min}$. A second input of the second comparison unit V2$_{min}$ is connected with the third register REG3. The first set value $F_{max}$ is storable in the third register.

The smaller of the two values present at the inputs is always output at one output of the second comparison unit V2$_{min}$. This output value constitutes the activation state z of the abstractor.

The output of the second comparison unit V1$_{min}$ is connected with the first register REG1 for storing the respective $z_{old}$ value and with a first input of the third comparison unit V3.

The input information E is fed to a second input of the third comparison unit V3 and the output information can be obtained at an output of the third comparison unit V3, according to the output function f, where $$f(z) = \begin{cases} 0 \text{ for } z < 0 \\ E \text{ for } z = 0 \\ 1 \text{ for } z > 0 \end{cases}$$

For the case where z=0, that is "1" and "0" occur at the same frequency, the input information E is put out.

According to the invention, it is now possible to realize in a simple manner an N-bit wide abstractor by connecting N individual 1-bit wide abstractors in parallel to thus be able to process input information of a width of N bits.

Such an N-bit wide abstractor can be employed, according to the invention, as an N-bit wide memory unit for storing N-bit wide digital information.

The thus formed memory unit serves, in particular, as a temporary memory unit, wherein an old memory value (pattern) can be overwritten by a new memory value (pattern).

Figure 4:
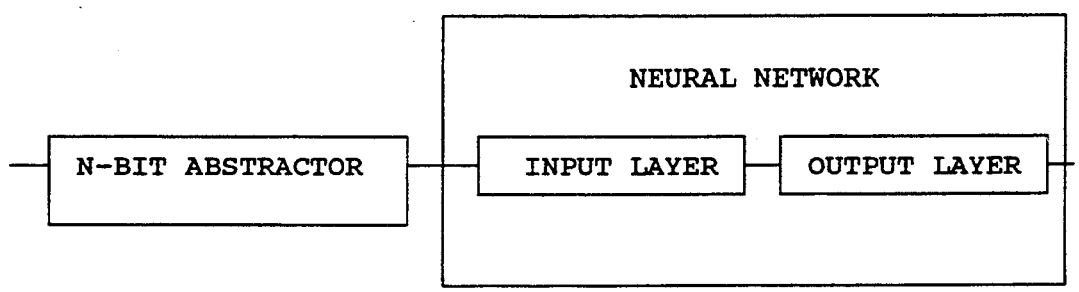
FIG. 4 is a Neural Network employing an N-bit wide abstractor.

According to the invention, as shown in FIG. 4, a neural network having a plurality of layers, including an input layer and an output layer can also be realized by connecting an N-bit wide abstractor ahead of the input layer. The N-bit wide abstractor then serves as a rough recognition unit for the training phase of the neural network.

In this case it is expedient to connect a decision unit to the output of the abstractor so as to release a pattern for the input layer whenever a value (pattern) generated by the abstractor has not changed any more over a predetermined number of steps.

It will be understood that the above description of the present invention is susceptible to various modifications, changes and adaptations, and the same are intended to be comprehended within the meaning and range of equivalents of the appended claims.

What is claimed is:

1. A digital 1-bit wide abstractor for generating an exemplary pattern from a digital input information E, the abstractor comprising an evaluation unit which performs a transfer function p and to whose input the digital input information E is fed, with the transfer function p being given by $$p(n) = 2n - 1 \text{ for } n = \begin{cases} 1, & \text{if } E = 1 \\ 0, & \text{if } E = 0 \end{cases}$$

the abstractor further comprising:
a first decision unit having a first input which is connected with an output of the evaluation unit, a second input to which the digital input information E is fed, and third and fourth inputs to which a first predeterminable set value $F_{max}$ and a second predeterminable set value $F_{min}$, respectively, are fed, with the first decision unit implementing an activation state z according to an activation function F, where $$z = F(z_{old}, p(n)) = \begin{cases} F_{min} & \text{for } z_{old} + p(n) < F_{min} \\ F_{max} & \text{for } z_{old} + p(n) > F_{max} \\ z_{old} + p(n) & \text{for others} \end{cases}$$

and F ($z_{old}$, p(n)) is the new state while $z_{old}$ is the old state of the abstractor, the first decision unit providing at an output thereof an output information according to an output function f where $$f(z) = \begin{cases} 0 \text{ for } z < 0 \\ E \text{ for } z = 0 \\ 1 \text{ for } z > 0 \end{cases}$$

wherein:
the first decision unit includes an adder unit whose first input is connected with the output of the evaluation unit, whose second input is connected with a first register and whose output is connected with a first input of a first comparison unit;
a second input of the first comparison unit is connected with a second register in which the second set value $F_{min}$ is stored;
the larger of the two values present at the two inputs of the first comparison unit is always output at an output of the first comparison unit and is fed to a first input of a second comparison unit;
a second input of the second comparison unit is connected with a third register in which the first set value $F_{max}$ is stored;
the smaller of the two values present at the inputs of the second comparison unit which constitutes the activation state z is always output at an output of the second comparison unit;
the output of the second comparison unit is connected with the first register and with a first input of a third comparison unit;
the digital input information E is fed to a second input of the third comparison unit; and the output information is output at an output of the third comparison unit according to the output function f.

2. A digital 1-bit wide abstracter according to claim 1, further comprising:

a second decision means for generating a sensitivity value s for the digital input information E, and having a first input which is connected with the output of the first decision unit, second and third inputs to which a third predeterminable set value $s_{max}$ and a fourth predeterminable set value $s_{min}$, respectively, are fed, and an output which is connected with a further input of the evaluation unit to provide the sensitivity value s to the evaluation unit, wherein the transfer function p becomes $$p(n,s) = (2n-1)s, \quad n = \begin{cases} 1, \text{ if } E = 1 \\ 0, \text{ if } E = 0 \end{cases}$$

and $$s = \begin{cases} s_{min} & f(z)_{new} = f(z)_{old} \\ & \text{for} \\ s_{max} & \text{others} \end{cases}$$

with s representing the sensitivity value for the digital input information E as a function of the output information.

3. An N-bit wide abstractor composed of N parallel connected digital 1-bit wide abstractors according to claim 1 wherein N is a positive whole number greater than 0.

4. A method of storing N-bit wide digital information which comprises utilizing the N-bit wide abstractor according to claim 3.

5. A digital 1-bit wide abstractor for generating an exemplary pattern from a digital input information E, the abstractor comprising:

evaluation means for receiving at an input thereof the digital input information E, and for producing an output according to a transfer function p thereof, the transfer function p being given by $$p(n) = 2n - 1 \text{ for } n = \begin{cases} 1, & \text{if } E = 1 \\ 0, & \text{if } E = 0 \end{cases}$$

the abstractor further comprising:

first decision means for receiving at a first input the output of the evaluation means, at a second input the digital input information E, and at respective third and fourth inputs a first predeterminable set value $F_{max}$ and a second predeterminable set value $F_{min}$, respectively, and for producing an output f(z) implementing an activation state z according to an activation function F, where $$z = F(z_{old}, p(n)) = \begin{cases} F_{min} & \text{for } z_{old} + p(n) < F_{min} \\ F_{max} & \text{for } z_{old} + p(n) > F_{max} \\ z_{old} + p(n) & \text{for others} \end{cases}$$

and F ($z_{old}$, p(n)) is the new state while $z_{old}$ is the old state of the abstractor, wherein the first decision means output f(z) is defined as follows:

$$f(z) = \begin{cases} 0 \text{ for } z < 0 \\ E \text{ for } z = 0 \\ 1 \text{ for } z > 0 \end{cases}$$

wherein the first decision means comprises an adder, first, second and third comparison units, and first, second and third registers;

wherein:

the adder has a first input connected with the output of the evaluation means, a second input connected with the first register and an output connected with a first input of the first comparison unit;

a second input of the first comparison unit is connected with the second register, the second register for storing the second set value $F_{min}$;

the first comparison unit outputs the larger of the two values present at the two inputs of the first comparison unit and is fed to a first input of the second comparison unit;

a second input of the second comparison unit is connected with the third register, the third register for storing the first set value $F_{max}$;

the second comparison unit outputs the smaller of the two values present at the inputs of the second comparison unit which constitutes the activation state z;

the output of the second comparison unit is connected with the first register and with a first input of the third comparison unit;

the digital input information E is fed to a second input of the third comparison unit; and the output f(z) is output by the third comparison unit.

6. The digital 1-bit wide abstractor according to claim 5, further comprising:

second decision means for generating a sensitivity value s for the digital input information E, the second decision means having a first input which is connected with the output of the first decision means, second and third inputs to which a third predeterminable set value $s_{max}$ and a fourth predeterminable set value $s_{min}$, respectively, are fed, and an output which is connected with a further input of the evaluation unit to provide the sensitivity value s to the evaluation unit, wherein the transfer function p becomes $$p(n,s) = (2n-1)s, \quad n = \begin{cases} 1, \text{ if } E = 1 \\ 0, \text{ if } E = 0 \end{cases}$$

and $$s = \begin{cases} s_{min} & f(z)_{new} = f(z)_{old} \\ & \text{for} \\ s_{max} & \text{others} \end{cases}$$

with s representing the sensitivity value for the digital input information E as a function of the first decision means output f(z).

7. An N-bit wide abstractor composed of N parallel connected digital 1-bit wide abstractors according to claim 5 wherein N is a positive whole number greater than 0.

8. A neural network comprising a plurality of layers, including an input layer and an output layer, and an N-bit wide abstractor composed of N parallel connected digital 1-bit wide abstractors according to claim 5, where N is a positive whole number greater than 0,
wherein the N-bit wide abstractor is connected to precede the input layer.

9. A method of storing N-bit wide digital information which comprises utilizing the N-bit wide abstractor according to claim 7.

10. A neural network comprising a plurality of layers, including an input layer and an output layer, and having an N-bit wide abstractor, the N-bit wide abstractor being composed of N parallel connected digital 1-bit wide abstractors, wherein N is a positive whole number greater than 0, for generating an exemplary pattern from a digital input information E, the 1-bit wide abstractors each comprising an evaluation unit which performs a transfer function p and to whose input the digital input information E is fed, with the transfer function p being given by $$p(n) = 2n - 1 \text{ for } n = \begin{cases} 1, & \text{if } E = 1 \\ 0, & \text{if } E = 0 \end{cases}$$

the abstractor further comprising:

a first decision unit having a first input which is connected with an output of the evaluation unit, a second input to which the digital input information E is fed, and third and fourth inputs to which a first predeterminable set value $F_{max}$ and a second predeterminable set value $F_{min}$, respectively, are fed, with the first decision unit implementing an activation state z according to an activation function F, where $$z = F(z_{old}, p(n)) = \begin{cases} F_{min} & \text{for } z_{old} + p(n) < F_{min} \\ F_{max} & \text{for } z_{old} + p(n) > F_{max} \\ z_{old} + p(n) & \text{for others} \end{cases}$$

and F $(z_{old}, p(n))$ is the new state while $z_{old}$ is the old state of the abstractor, the first decision unit providing at an output thereof an output information according to an output function f where $$f(z) = \begin{cases} 0 \text{ for } z < 0 \\ E \text{ for } z = 0 \\ 1 \text{ for } z > 0 \end{cases}$$

wherein the N-bit wide abstractor is connected to precede the input layer.

* * * * *